(12) United States Patent
Stolz

(10) Patent No.: US 6,981,457 B2
(45) Date of Patent: Jan. 3, 2006

(54) PARTICULATE MATERIAL DISPENSER

(75) Inventor: Donald James Stolz, Kelowna (CA)

(73) Assignee: Dirt Work Products Inc., Kelowna (CA)

( * ) Notice: Subject to any disclaimer, the term of this patent is extended or adjusted under 35 U.S.C. 154(b) by 0 days.

(21) Appl. No.: 11/049,940

(22) Filed: Feb. 4, 2005

(65) Prior Publication Data
US 2005/0127116 A1 Jun. 16, 2005

Related U.S. Application Data

(63) Continuation-in-part of application No. 10/454,641, filed on Jun. 5, 2003, now abandoned.

(60) Provisional application No. 60/390,433, filed on Jun. 24, 2002.

(51) Int. Cl.
*A01C 5/02* (2006.01)
*A01C 7/08* (2006.01)
*A01C 17/00* (2006.01)
*G01F 11/10* (2006.01)

(52) U.S. Cl. .......................... 111/130; 111/90; 111/95; 222/344

(58) Field of Classification Search ............ 111/89–99, 111/100–117, 130; 222/287, 288, 290, 310, 222/316, 344, 345–352
See application file for complete search history.

(56) References Cited

U.S. PATENT DOCUMENTS 5,497,713 A  3/1996 Anderson et al.

*Primary Examiner*—Christopher J. Novosad
(74) *Attorney, Agent, or Firm*—Antony C. Edwards

(57) ABSTRACT

A dispenser for dispensing particulate matter includes a hollow elongate body having sidewalls extending between opposite first and second ends. First and second end seals seal the first and second ends respectively. The first end seal has an orifice through which the particular material, when stored in the body, is dispensed. A baffle is mounted within the first end, generally abutting against one side wall of the body. The baffle at least partially occludes the orifice and forms a pocket between the orifice and the baffle. A convoluted dispensing flow path is thereby formed for dispensing the particulate material from the body, around the baffle and out of the dispenser through the orifice.

17 Claims, 5 Drawing Sheets

Figure 1:
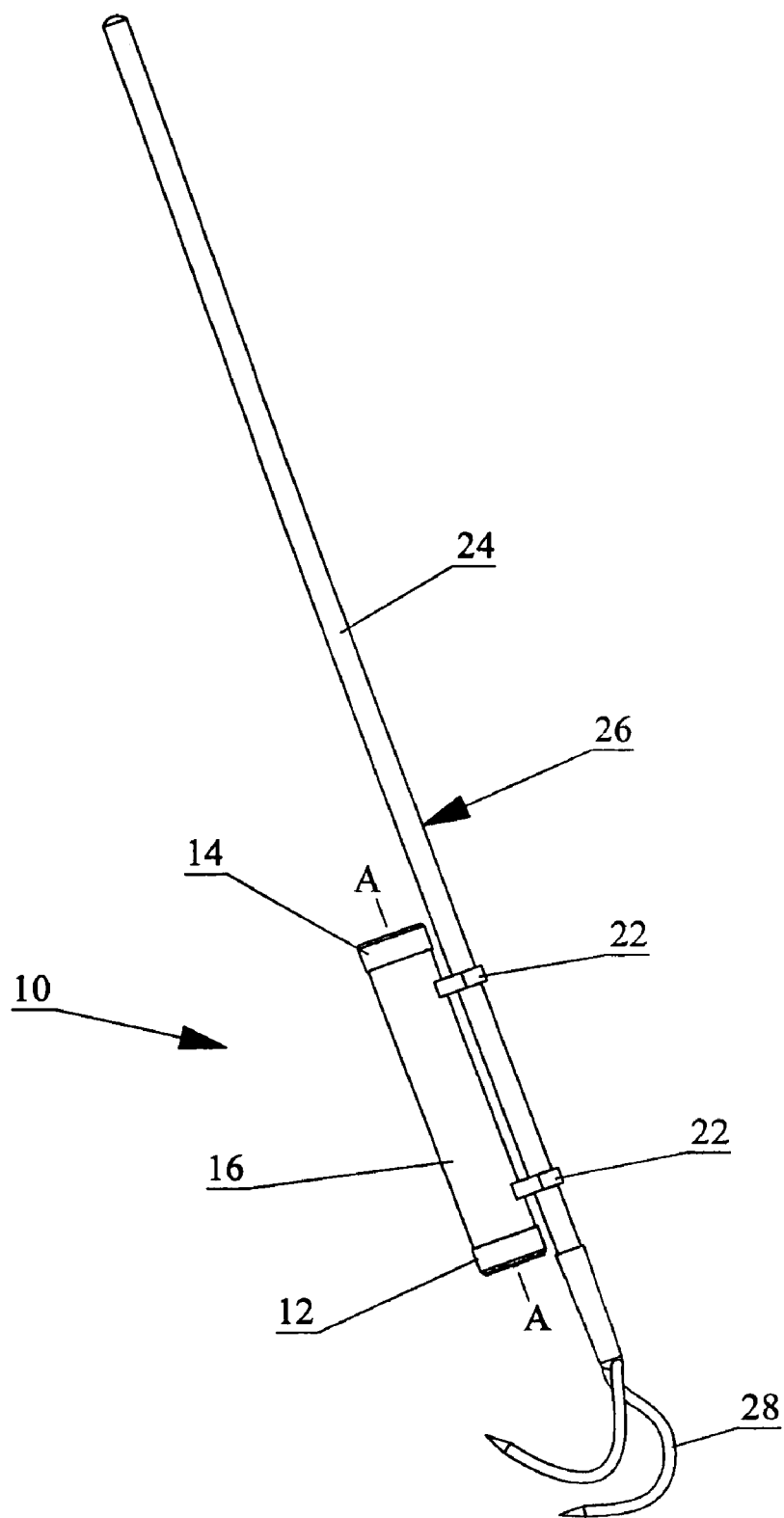
Figure 2:
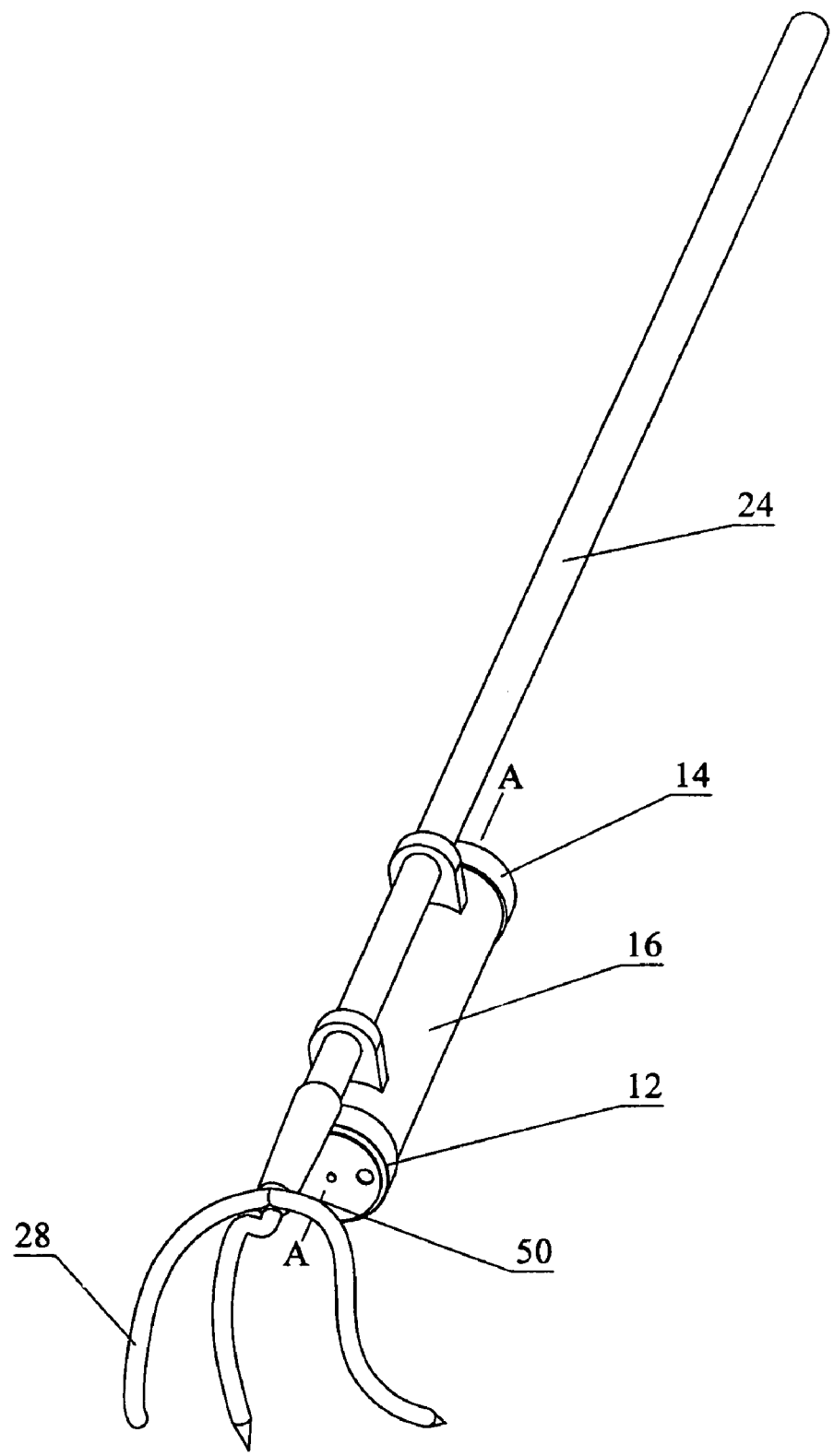
Figure 2A:
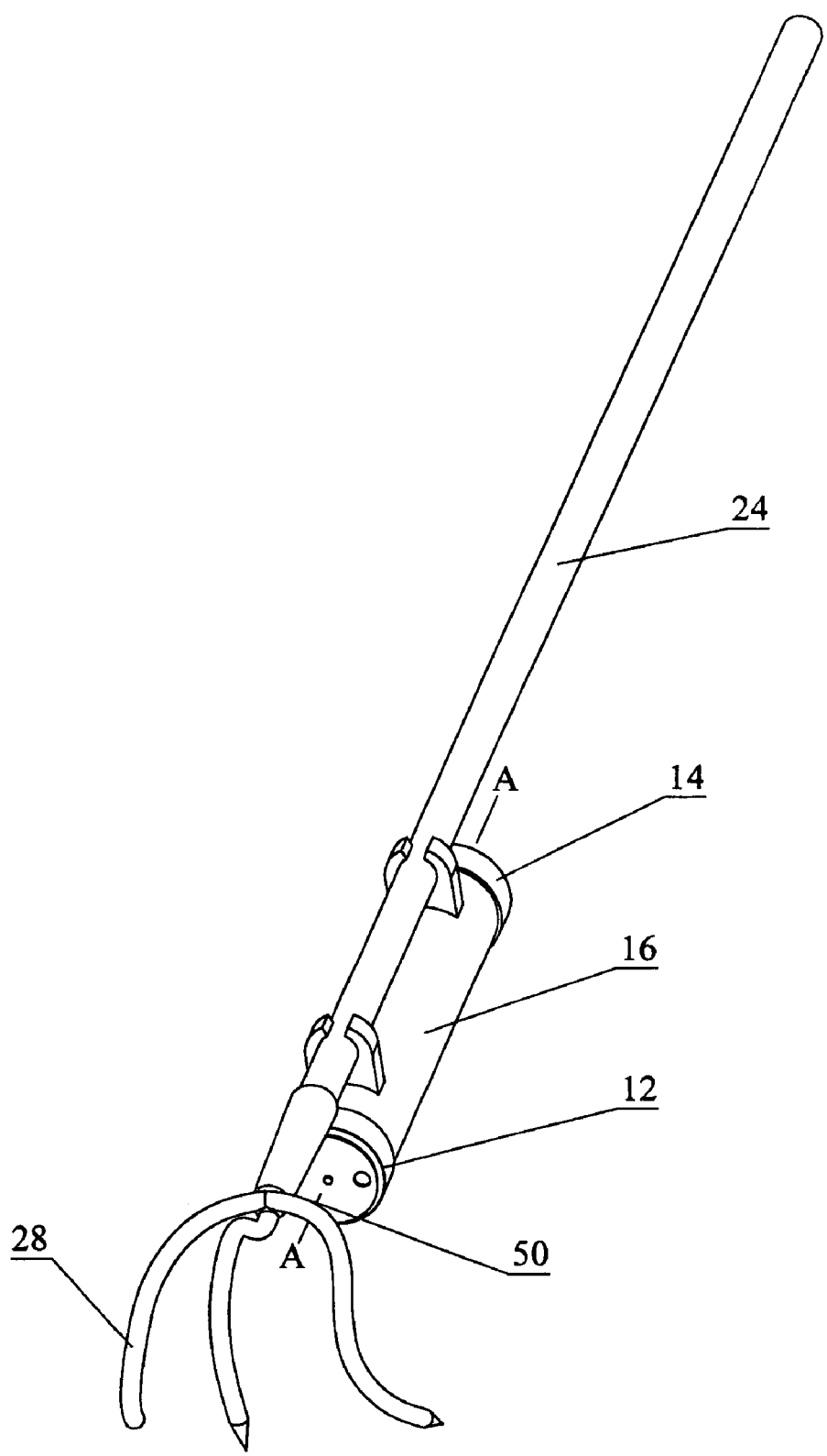
Figure 3:
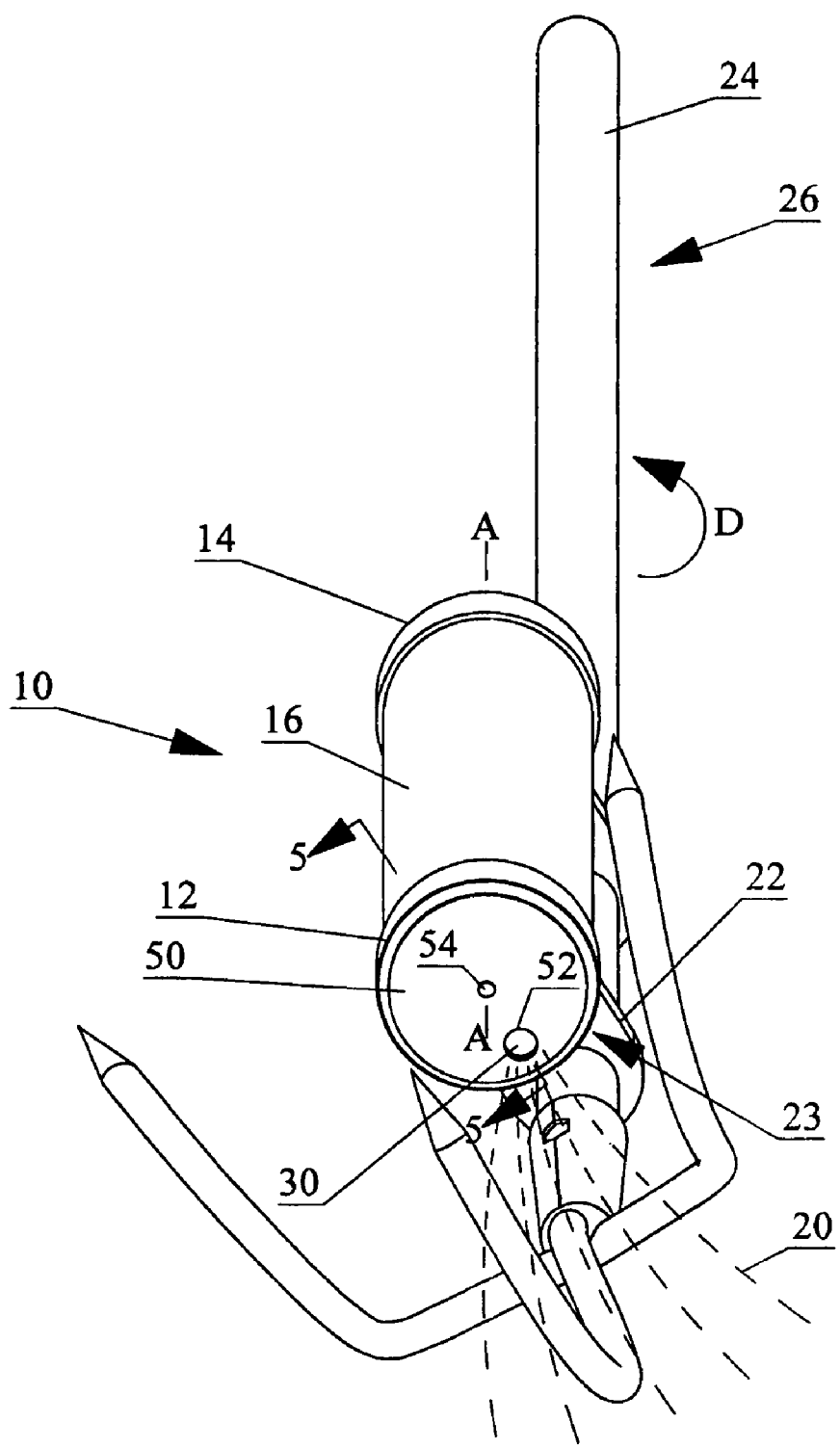

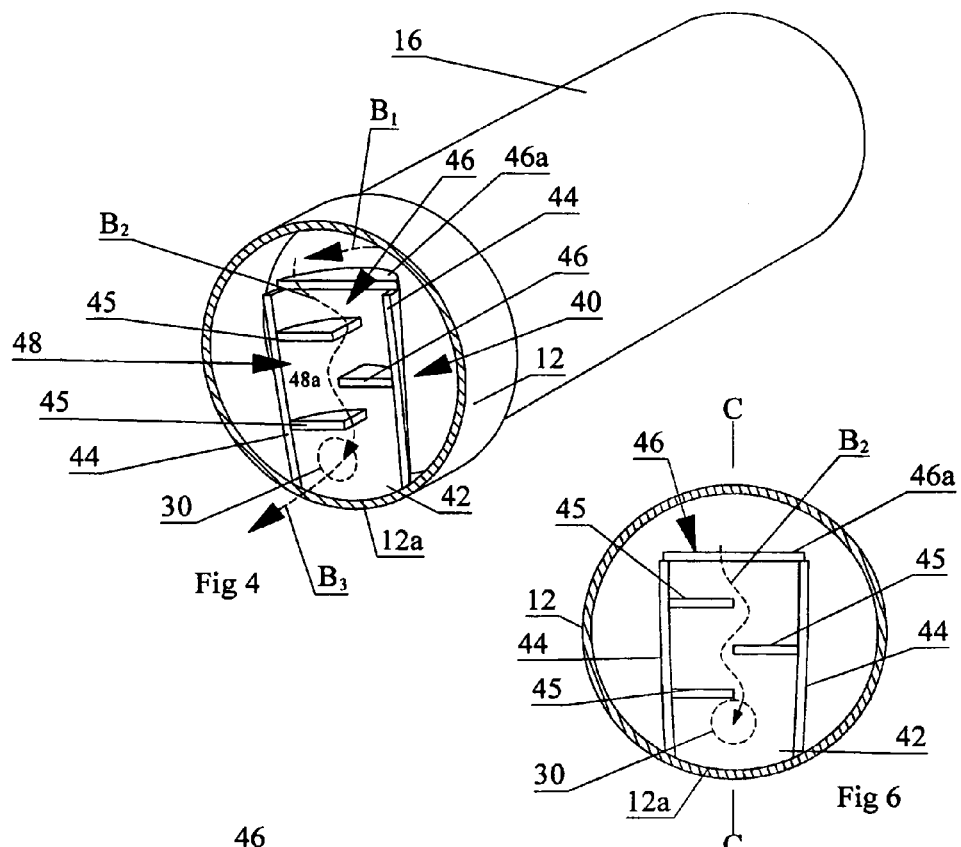
Fig 4
Fig 6
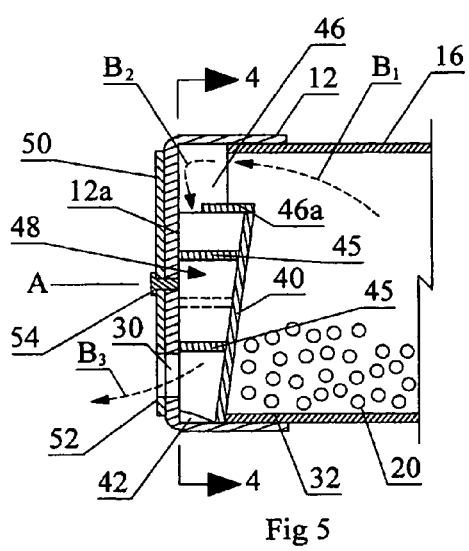
Fig 5
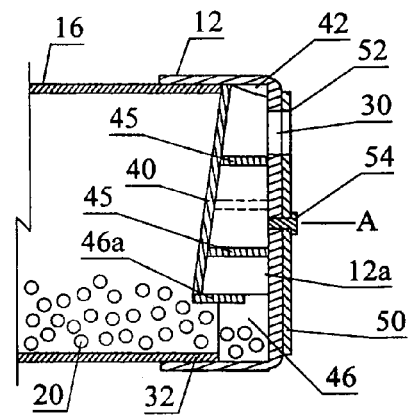
Fig 5a

PARTICULATE MATERIAL DISPENSER

CROSS REFERENCE TO RELATED APPLICATION

This is a Continuation-in-Part application from U.S. patent application Ser. No. 10/454,641 filed Jun. 5, 2003 now abandoned which claims priority from U.S. Provisional Patent Application No. 60/390,433 filed Jun. 24, 2002 entitled Particulate Material Dispenser.

FIELD OF THE INVENTION

This invention relates to the field of lightweight particulate material dispensers, which may be hand-held or removably mounted to the handle of an implement such as a garden-cultivating implement, or other tool, for the convenient application and sprinkling of free-flowing particulate material such as fertilizer, sand or other particulate material.

BACKGROUND OF THE INVENTION

By way of background, and as one illustrative example, the growing of garden plants for either aesthetics or sustenance involves regular surface manipulation of the garden soil for air and water entrainment and weed control, as well as for topical application of fertilizers around the plant for its nourishment and healthy growth.

The surface manipulation of the garden soil is generally undertaken by hand utilizing an implement of choice, usually a hoe or multi-tined cultivator, which enables the gardener to get in and around the plants without having to walk in the general vicinity of the plants and undesirably compact the soil. The application of fertilizer on the other hand may either be achieved by hand or by using a broadcast spreader or a scoop. A broadcast spreader is generally unsatisfactory since there is generally poor directional control of fertilizer within the garden environment so that much of the fertilizer is wasted by being accidentally misdirected onto pathways or outside the garden. Further, some of the fertilizer may be retained on the foliage or fruit of the plants where it can cause harm. Fertilizing by hand or by using a scoop requires one to walk within the garden thereby compacting the soil with the resultant need to re-cultivate the soil surface.

There are many other occasions when it is advantageous to sprinkle a free-flowing particulate material, for example in cooking, where the particulate may advantageously be sprinkled from a dispensing container or jigger by the use of an invertible valve on the container or jigger.

SUMMARY OF THE INVENTION

In one aspect, the present invention includes a light weight, generally tubular shaped dispenser which may be hand-held or which is mountable to the elongated handle of an implement such as a garden cultivating implement, for example a hoe or multi-tined cultivator, in proximity to the head thereof. An end cap of the dispenser is provided with an orifice through which free-flowing particulate material such as granulated fertilizer, sand or the like may be accurately dispensed.

The dispenser has at least one or more internal baffles mounted adjacent the dispensing orifice on the end cap so as to selectively restrict the discharge of particulate material flowing through the orifices. The baffles are mounted in a housing such that the dispenser must be inverted about its longitudinal axis and mildly agitated or shaken in general longitudinal axial alignment with the handle of the implement, so that particulate material can be dispensed.

In one embodiment of the invention an end plate, having at least one dispensing aperture is rotatably mounted to the end cap of the dispenser such that a single aperture on the may be selectively aligned with the dispensing orifice in the end cap.

The body of the dispenser may be made of translucent or of transparent material so that the amount of material contained within the dispenser may be clearly evident.

The dispenser body is hollow and may be, although is not necessarily, generally tubular and may be elongated. The dispenser body has first and second opposite ends. The end cap may be either formed or mounted on the first end of the body. The second end of the body may be sealed or capped so as to contain particulate material within the body.

A baffle housing is mounted to the inner face of the end cap, which advantageously, although not necessarily, is circular in cross section. Arcuately shaped baffles extend generally at right angles to the direction of flow of particulate material through the housing and are mounted in the baffle housing. The baffles are mounted in a staggered spaced apart, parallel array within the housing, staggered so that adjacent baffles are mounted to opposite sides of the baffle housing. Each baffle extends from the wall of the housing part-way into the housing. In one embodiment the baffles may extend about half-way into the housing so that the free ends of the baffles all lie on a common plane bisecting the housing. This is not intended to be limiting as the baffles may be longer or shorter so as to not place the ends of the baffles on a common plane. The baffle housing may be shaped as a funnel section, that is, as a sector of a conical frustum or cone so as to allow the channelled passage of particulate material from storage in the body of the dispenser, along an arcuate path sinuously weaving around the baffles, and into the dispensing orifice in the end cap so as to dispense from the dispenser.

In one alternative embodiment, the end cap may be provided with an externally mounted, rotatable end plate having at least one dispensing orifice. Rotation of the end plate selectively aligns the dispensing orifice in the end plate with the dispensing orifice in the end cap so as to allow for selective shut-off or dispensing of the particulate material.

In one embodiment, the body of the dispenser is removably mountable to the handle of a garden-cultivating implement such as a hoe or tined cultivator, although in other embodiments the dispenser may be permanently mounted to the implement. The garden implement may alternatively be a snow shovelling implement when de-icing material and sand is to be spread. These and other elongate implements are collectively referred to herein as "implements". To this end the body may have one or more spring clips fixed to it by riveting or the like, so that the spring clips clip the dispenser to the implement.

The dispenser is mounted to the implement with the end cap positioned nearest to the head of the implement. Consequently, gravity urges the particulate contents to flow to the end-cap end of the dispenser when the head of the implement is lowered for use. The contents of the dispenser are inhibited from accidental discharge from the dispensing orifice in the end cap by the internal baffles in the baffle housing, and also in one embodiment by a further lid or rotatable end-plate on the cap which is aligned to open the discharge for operation of the dispenser. Inverting the dispensing tube by simply rotating the implement about its long axis and thus also inverting the attached dispensing tube one hundred eighty degrees about the longitudinal axis of the implement, followed by a mild shaking, agitation, or tapping on ground surface of both the implement and dispenser, metres a small portion of the stored particulate material, usually less than or equal to the volumetric capacity of the baffle housing, from the housing so as to be discharged from the dispensing orifice.

The dispenser of the present invention may be characterized as a dispenser for dispensing particulate matter wherein the dispenser includes a hollow elongate body having sidewalls extending between opposite first and second ends. First and second end seals seal the first and second ends respectively. The first end seal, which may be an end cap, has an orifice through which the particulate material, when stored in the body, is dispensed. A baffle housing is mounted within the first end so as to abut against an end wall of the first end and to occlude the dispensing orifice. Baffles within the baffle housing at least partially occlude a flow passageway through the baffle housing with leads to the orifice. A convoluted dispensing flow path is thereby formed for dispensing the particulate material from storage in the body, around the baffles and out of the dispenser through the orifice. The dispensing orifice may be adjacent to one side wall of the dispenser and adjacent an outflow end of the baffle housing, opposite to an inflow opening into the baffle housing.

In one embodiment, the first end seal is an end cap removably mounted onto the first end of the body by cap mounting means. Both the first and second seals may be end caps. The cap mounting means may be a snug sliding friction fit of the first end cap over the first end of the body.

In an alternative embodiment, the first end seal further includes an apertured member rotatably mounted for rotation relative to the first end seal so that a user may selectively align an aperture on the apertured member with at least a portion of the orifice. The user may thereby selectively control the amount of occlusion of the orifice by the apertured member. The apertured member may be a rigid disc having at least one hole therethrough. Alternatively, the disc may have an array of radially spaced holes of different sizes. Further alternatively, the hole may be an elongate arcuate narrowing aperture.

A mounting means may be provided for mounting of the dispenser to an implement handle. The mounting means may be mounted to a sidewall of the dispenser or to the implement for releasably mounting the body of the dispenser to, for example, the handle of the implement. For example, the mounting means may include one or more resilient clamping members mounted to either the dispenser or the implement.

The baffle housing may be a generally frusto-conically shaped section having a narrow end and an opposite wide end. The narrow end may be mounted to a sidewall and mounted adjacent the first end seal so as to occlude the dispensing orifice in the end cap. The wide end defines an oppositely disposed opening, opposite to the narrow end, into the housing. The baffle housing thereby forms a funnel from the wide end to the orifice adjacent the narrow end. A plurality of rigid weir-like baffles are mounted in the baffle housing so as to partially block the flow passageway through the baffle housing.

BRIEF DESCRIPTION OF THE DRAWINGS

FIG. 1, is a side perspective view of a garden cultivator implement with the dispenser of the present invention mounted thereto with the cultivator head turned downwards in its cultivating orientation.

FIG. 2 is a perspective view of the implement and dispenser of FIG. 1.

FIG. 2*a* is a perspective view of an alternative embodiment of the dispenser of FIG. 2.

FIG. 3 is a side perspective view of the garden cultivator implement and dispenser of FIG. 1 with the implement inverted out of its cultivator mode so as to invert the dispenser into its dispensing mode.

FIG. 4 is a perspective sectional view along line 4—4 in FIG. 5.

FIG. 5 is a sectional view along line 5—5 in FIG. 3.

FIG. 5*a* is the view of FIG. 5 with the dispenser inverted into the orientation of FIG. 2.

FIG. 6 is an elevation view of the view of FIG. 4.

DETAILED DESCRIPTION OF EMBODIMENTS OF THE INVENTION

With reference to the drawing figures, wherein similar characters of reference denote corresponding parts in each view, the particulate material dispenser 10 is illustrated as having end caps 12 and 14 respectively, which close off the ends of a generally elongated hollow tubular body 16. In one embodiment, body 16 may be formed with sealed ends instead of using end caps to seal the ends of the tube. Dispenser 10 may be larger or smaller depending on the weight which may be conveniently carried by the user and the manner in which the dispenser is mounted to the implement 24. Either end cap may be removable to allow the insertion into body 16 of particulate material 20, for example and without intending to be limiting, such as fertilizer, sand or other particulate material, in one use such as utilized within a flower or vegetable garden environment. End cap 14 may also be fixed to body 16 or tubular body 16 otherwise may be sealed at one or both ends, and body 16 provided with a side-filling closable aperture, door or other filling means (not shown). In a disposable embodiment, the dispenser is pre-filled and non refillable by an end user. Tubular body 16 may be provided with external mounting means such for example clips or brackets 22. As seen in FIG. 2, brackets 22 are mounted on, or clip on as seen in FIG. 2*a*, or may frictionally engage, etc an elongated handle 24 of an implement 26, for example the handle of a garden implement such as a hoe, cultivator or rake or like tool having an implement head 28 which has one or more useful orientations when rotated about the longitudinal axis of the handle. Dispenser 10 may be mounted on top of, or underneath the handle as convenient for the particular design. Of course, a small hand-held dispenser 10 need not be handle-mounted at all.

First end cap 12 is provided with a dispensing orifice 30, through which particulate material 20 may flow to exit body 16. Orifice 30 is formed in end cap 12 so as, in one embodiment, to be in adjacent to inner surface 32 of tubular body 16.

An arcuately shaped baffle housing 40 extends generally at right angles to the longitudinal axis A of tubular body 16. The housing is mounted within end cap 12. Baffle housing 40 may be shaped as a conical sector or frusto-conical sector. First end 42 of the housing is mounted over orifice 30. First end 42 is affixed to the inner surface 12*a* of end cap 12. Oppositely disposed side edges 44 of baffle housing 40 are also affixed to inner surface 12*a*. Baffle housing 40 thus creates a pocket or compartment 48 within end cap 12 in flow communication with dispensing orifice 30 so that material in the pocket may be metered from the orifice in a controlled manner. Second end 46 of baffle housing 40, opposite to that of first end 42, is partly closed-off by flange 46a. Flange 46a is spaced apart from the adjacent inside surface 12a of cap 12 so as to provide an entryway into a convoluted passageway 48a within compartment 48 for the flow of particulate material 20 firstly in direction $B_1$ from storage in dispenser 10 into the entryway at second end 46, secondly in direction $B_2$ through compartment 48 along passageway 48a until the flow is turned generally ninety degrees at inner surface 12a so as to exit in direction $B_3$ from dispensing orifice 30 in first end cap 12. Baffle housing 40 has a plurality of flow restricting walls or baffles 45 extending partially across passageway 48a which partially occludes free flow through compartment 48 and which define passageway 48a and constrain the flow to its winding flow path.

The flow path forms a "dogs-leg", that is, relative to the longitudinal axis A of the dispenser body, the flow path for the particulate material in the body is initially parallel to the longitudinal axis and toward the end cap. The flow is re-directed by the end cap into the baffle housing through an opening in one end, in one embodiment the wide end, of the baffle housing. The re-direction of the flow into the housing turns the flow through ninety degrees so as to flow perpendicular to the longitudinal axis from the housing opening towards the dispensing orifice in the end cap. The flow at the dispensing orifice is once again turned through generally ninety degrees, that is, once again is turned to flow substantially parallel to the longitudinal axis as the flow of particulate material flows through the dispensing orifice in the end cap so as to exit from the dispenser.

Thus the flow path may be described for ease of understanding as having three stages or legs. The first leg $B_1$ is the path of the particulate prior to entry into the baffle housing. The second leg $B_2$ is the path of the particulate through the baffle housing as the particulate winds its way past the baffles. The third leg $B_3$ is the particulate path upon exit from the baffle housing.

The first leg is characterized for simplicity as being substantially or generally parallel to the longitudinal axis of the dispenser body. In actuality, with the dispenser oriented into its dispensing position, that is with the dispensing orifice downwards, the particulate is shook in the dispenser so as to impart both forward motion towards the baffle housing, that is motion which is generally parallel to the longitudinal axis of the dispenser body, and vertical motion orthogonal to the longitudinal axis of the dispenser so as to lift the particulate from where it pools on the lowermost surface of the dispenser body upwardly so that it may enter the opening into the housing.

The second leg is characterized for simplicity as a winding flow path the particulate follows as it passes under force of gravity through the opening into the baffle housing and down through the baffles in the baffle housing. In a preferred embodiment the opening into the baffle housing may be partly occluded, forming in essence a first baffle (although not referred to as such herein), and the baffle housing contains three half-baffles. A half-baffle is a baffle which extends and blocks flow through substantially one-half of the passageway formed by the baffle housing so that the free ends of the baffles lie substantially on a common plane C bisecting the end cap and body of the dispenser. The three half-baffles are staggered along the passageway and may be parallel to one another so that two baffles extend inwardly into the flow path from one side of the passageway, and a third baffle, interleaved between the other two baffles, extends into the flow path from the opposite side of the passageway. The flow path is thus constrained to sinuously, if not sinusoidally, undulate through and past the free or distal ends of the baffles. Again, in the preferred embodiment illustrated, which is not intended to be limiting, the free or distal ends of the baffles terminate substantially in a common plane C which bisects the passageway and includes the longitudinal axis A of the dispenser body.

The third leg is characterized as the particulate flow path upon exit from the dispensing orifice in the end cap. The third leg of the flow path is re-directed ninety degrees from the second leg of the flow path as the flow exits the downstream-most baffle, drops towards the lower-most surface of the baffle housing (which may be an interior wall of the dispenser body), and turns a right-angle or otherwise is re-directed perpendicularly to exit in a direction generally parallel to the longitudinal axis of the dispensing body.

A rotatable end plate 50 is rotatably mounted externally on first end cap 12 for rotation about longitudinal axis A. End plate 50 is provided with a dispensing orifice 52. As end plate 50 is rotated about pin 54 to selectively align a dispensing orifice 52 with dispensing orifice 30 in the first end cap 12, control over the amount of particulate material discharged from dispenser 10 is either controlled or completely shut-off.

In use particulate material does not just fall from dispenser 10 but must be manipulated, for example by shaking the dispenser so as to cause particulate 20 to flow to and under flange 46a in direction $B_1$, and along a convoluted path in direction $B_2$ to reach orifice 30 by the selective inversion of the dispenser about axis A for example by the rotation of handle 24 in direction D when the dispenser is mounted to the handle. The dispenser 10 may be mounted to the implement handle 24 for example by means of bands 22 clamping base 23 conformably against handle 24, base 23 securely mounted to and along a sidewall of body 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A dispenser for dispensing free-flowing particulate matter, said dispenser comprising a hollow elongate body having sidewalls extending between opposite first and second ends, first and second end seals sealing said first and second ends respectively, said first end seal having an orifice through which said particular matter, when stored in said body, is dispensed, a baffle housing mounted within said first end, said baffle housing at least partially occluding said orifice and forming a compartment, an array of baffles mounted within said baffle housing so as to partly occlude a flow passageway through said compartment extending between an opening into said baffle housing at one end of said baffle housing and an opposite end of said baffle housing adjacent said one side wall, said array of baffles constraining said flow passageway a convoluted dispensing flow path is formed for dispensing said particulate matter from said body, around said array of baffles and out of said dispenser through said orifice, each baffle staggered and separate from one another and immovably mounted to said baffle housing so as to remain stationary relative to said baffle housing and said body.

2. The dispenser of claim 1 wherein said first end seal is a first end cap removably mounted onto said first end of said body by cap mounting means.

3. The dispenser of claim 2 wherein said cap mounting means is a snug sliding friction fit of said first end cap over said first end of said body.

4. The dispenser of claim 1 wherein said dispensing orifice is adjacent said one side wall.

5. The dispenser of claim 1 wherein said first end seal further comprises an apertured member rotatably mounted for rotation relative to said first end seal for selective alignment of an aperture on said apertured member with at least a portion of said orifice so as to selectively control the amount of occlusion of said orifice by said apertured member.

6. The dispenser of claim 5 wherein said apertured member is a rigid disc having at least one hole therethrough.

7. The dispenser of claim 1 wherein said first and second end seals are first and second end caps.

8. The dispenser of claim 1 wherein a mounting means is mounted to a sidewall of said sidewalls, said mounting means for releasably mounting said body to an elongate rigid handle of an implement.

9. The dispenser of claim 8 wherein said mounting means includes at least a pair of band members mountable to the handle.

10. The dispenser of claim 1 wherein said baffle housing is a generally frusto-conically shaped section having a narrow end and an opposite wide end, wherein said narrow end is mounted to said one sidewall adjacent said first end seal, and said wide end defines an opening into said pocket, said baffle housing thereby forming a funnel from said wide end to said orifice adjacent said narrow end.

11. The dispenser of claim 10 further comprising a rigid flange across said wide end so as to partially block said opening.

12. A dispenser for dispensing free-flowing particulate matter, said dispenser comprising a hollow elongate body having sidewalls extending between opposite first and second ends, first and second end seals sealing said first and second ends respectively, said first end seal having an orifice through which said particular matter, when stored in said body, is dispensed, a baffle housing mounted within said first end, said baffle housing at least partially occluding said orifice and forming a compartment, an array of baffles mounted within said baffle housing so as to partly occlude a flow passageway through said compartment extending between an opening into said baffle housing at one end of said baffle housing and an opposite end of said baffle housing adjacent said one side wall, said array of baffles constraining said flow passageway a convoluted dispensing flow path is formed for dispensing said particulate matter from said body, around said array of baffles and out of said dispenser through said orifice, wherein said first end seal further comprises an apertured member rotatably mounted for rotation relative to said first end seal for selective alignment of an aperture on said apertured member with at least a portion of said orifice so as to selectively control the amount of occlusion of said orifice by said apertured member.

13. The dispenser of claim 12 wherein said apertured member is a rigid disc having at least one hole therethrough.

14. A dispenser for dispensing free-flowing particulate matter, said dispenser comprising a hollow elongate body having sidewalls extending between opposite first and second ends, first and second end seals sealing said first and second ends respectively, said first end seal having an orifice through which said particular matter, when stored in said body, is dispensed, a baffle housing mounted within said first end, said baffle housing at least partially occluding said orifice and forming a compartment, an array of baffles mounted within said baffle housing so as to partly occlude a flow passageway through said compartment extending between an opening into said baffle housing at one end of said baffle housing and an opposite end of said baffle housing adjacent said one side wall, said array of baffles constraining said flow passageway a convoluted dispensing flow path is formed for dispensing said particulate matter from said body, around said array of baffles and out of said dispenser through said orifice, wherein said baffle housing is a generally frusto-conically shaped section having a narrow end and an opposite wide end, wherein said narrow end is mounted to said one sidewall adjacent said first end seal, and said wide end defines an opening into said pocket, said baffle housing thereby forming a funnel from said wide end to said orifice adjacent said narrow end.

15. The dispenser of claim 14 further comprising a rigid flange across said wide end so as to partially block said opening.

16. The dispenser of claim 14 wherein a mounting means is mounted to a sidewall of said sidewalls, said mounting means for releasably mounting said body to an elongate rigid handle of an implement.

17. The dispenser of claim 16 wherein said mounting means includes at least a pair of band members mountable to the handle.

* * * * *